(12) United States Patent
Guzenda

(10) Patent No.: US 10,089,410 B2
(45) Date of Patent: Oct. 2, 2018

(54) FOR ACCELERATION OF PATHWAY SELECTION, APPLICATION, AND RANKING IN A HYBRID NETWORK

(75) Inventor: Leon Guzenda, Rio Vista, CA (US)

(73) Assignee: OBJECTIVITY, INC., San Jose, CA (US)

( * ) Notice: Subject to any disclaimer, the term of this patent is extended or adjusted under 35 U.S.C. 154(b) by 659 days.

(21) Appl. No.: 12/772,277

(22) Filed: May 3, 2010

(65) Prior Publication Data

US 2011/0246671 A1    Oct. 6, 2011

Related U.S. Application Data

(63) Continuation-in-part of application No. 12/753,835, filed on Apr. 2, 2010.

(51) Int. Cl.
   *G06F 15/173* (2006.01)
   *G06F 17/30* (2006.01)

(52) U.S. Cl.
   CPC .............. *G06F 17/30958* (2013.01)

(58) Field of Classification Search
   CPC ................................. G06F 17/30958
   USPC ........................................ 709/240
   See application file for complete search history.

(56) References Cited

U.S. PATENT DOCUMENTS

| | | | |
|---|---|---|---|
| 5,504,885 A | 4/1996 | Alashqur | |
| 5,893,108 A | 4/1999 | Srinivasan et al. | |
| 5,926,463 A | 7/1999 | Ahearn et al. | |
| 6,917,985 B2* | 7/2005 | Madruga et al. | 709/238 |
| 6,961,310 B2* | 11/2005 | Cain | 370/238 |
| 7,633,940 B1* | 12/2009 | Singh | H04L 45/12 370/237 |
| 7,754,543 B2 | 7/2010 | Soda | |
| 7,860,895 B1 | 12/2010 | Scofield et al. | |
| 7,945,559 B2 | 5/2011 | Hays | |
| 8,117,187 B2 | 2/2012 | Mostl | |
| 8,176,036 B2 | 5/2012 | Srivastava et al. | |
| 8,285,859 B2 | 10/2012 | Boldyrev et al. | |
| 8,543,681 B2 | 9/2013 | Bearden et al. | |
| 8,560,671 B1 | 10/2013 | Yahalom et al. | |
| 9,021,113 B2 | 4/2015 | Carr et al. | |
| 2003/0086425 A1 | 5/2003 | Bearden et al. | |
| 2003/0130821 A1 | 7/2003 | Anslow et al. | |
| 2004/0024573 A1 | 2/2004 | Allen et al. | |
| 2004/0143678 A1* | 7/2004 | Chari et al. | 709/240 |

(Continued)

*Primary Examiner* — Robert B McAdams
(74) *Attorney, Agent, or Firm* — Patrick Reilly

(57) ABSTRACT

Methods, systems and computer-readable medium are provided for selecting and ordering pathways identified between two selected nodes of a hybrid network. Nodes within the network have named relationships that may have 1:1, 1:many, many:1 or many:many cardinality. An algorithm is applied to predetermine the optional search path for finding relationships between any two rows of any of one or more tables of one or more relational databases, including relationships defined between other tables. The schemas of one or more target relational databases, either derived or input, is converted into an object-oriented schema that explicitly defines relationships between columns in the tables of the relational database and represents the tables as object classes. The schemas are analyzed and optimal search paths are derived and stored for subsequent use. A query engine accesses the predefined search paths in order to execute queries.

20 Claims, 10 Drawing Sheets

(56) References Cited

U.S. PATENT DOCUMENTS

| | | |
|---|---|---|
| 2006/0149712 A1 | 7/2006 | Kindsvogel et al. |
| 2006/0182034 A1 | 8/2006 | Klinker et al. |
| 2006/0287981 A1* | 12/2006 | Meyers et al. .................... 707/2 |
| 2007/0058631 A1 | 3/2007 | Mortier et al. |
| 2008/0209046 A1* | 8/2008 | Karkanias et al. ........... 709/227 |
| 2009/0292814 A1 | 11/2009 | Ting et al. |
| 2011/0035673 A1 | 2/2011 | Chou et al. |
| 2011/0078188 A1 | 3/2011 | Li et al. |
| 2011/0191200 A1 | 8/2011 | Bayer et al. |
| 2012/0197934 A1 | 8/2012 | Panigrahy et al. |
| 2012/0227086 A1 | 9/2012 | Dale et al. |
| 2013/0282806 A1 | 10/2013 | Steinberg et al. |
| 2013/0318228 A1 | 11/2013 | Raja et al. |
| 2013/0325847 A1 | 12/2013 | Suchter et al. |
| 2014/0074893 A1 | 3/2014 | Griffin |
| 2014/0122585 A1 | 5/2014 | Delong |

* cited by examiner

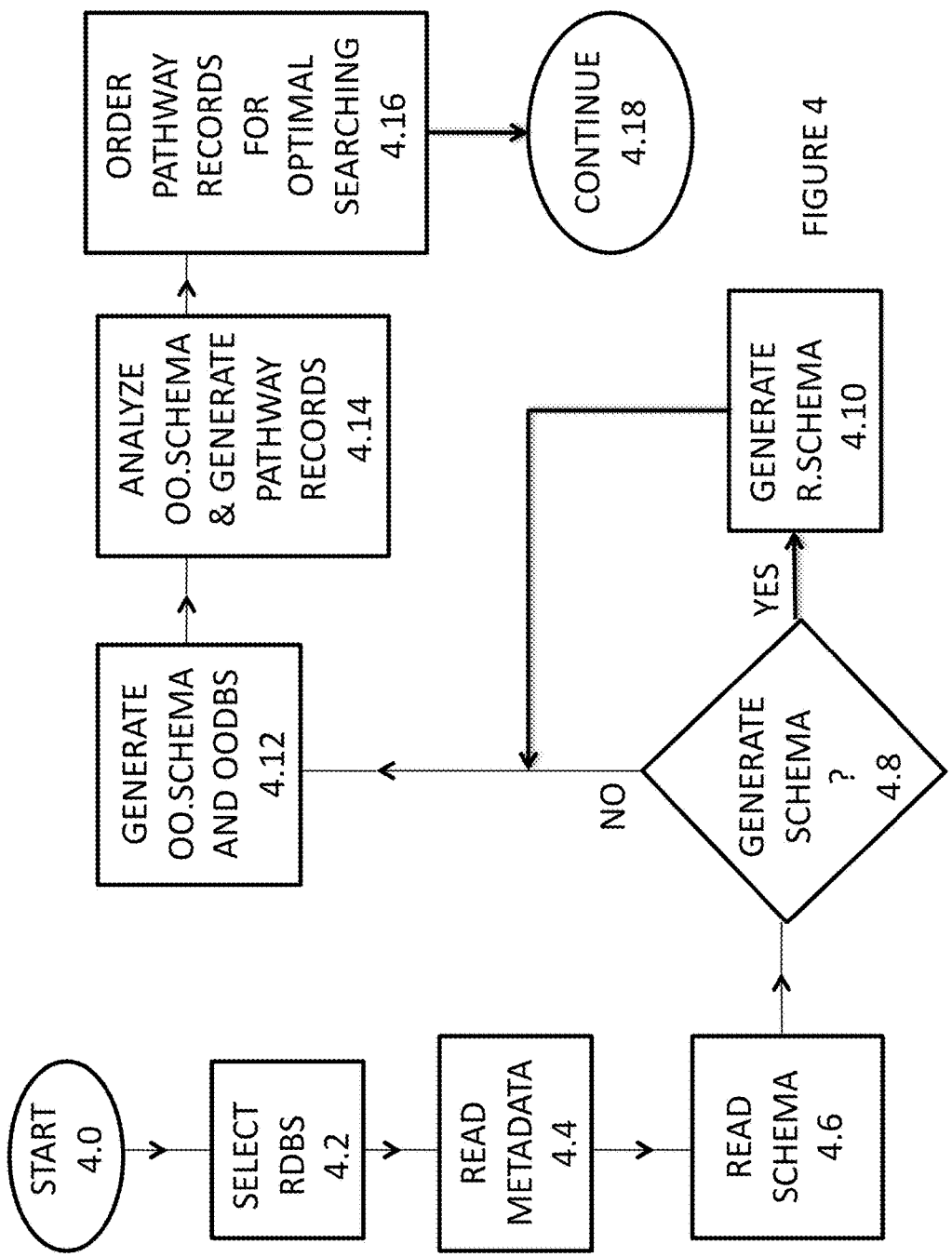

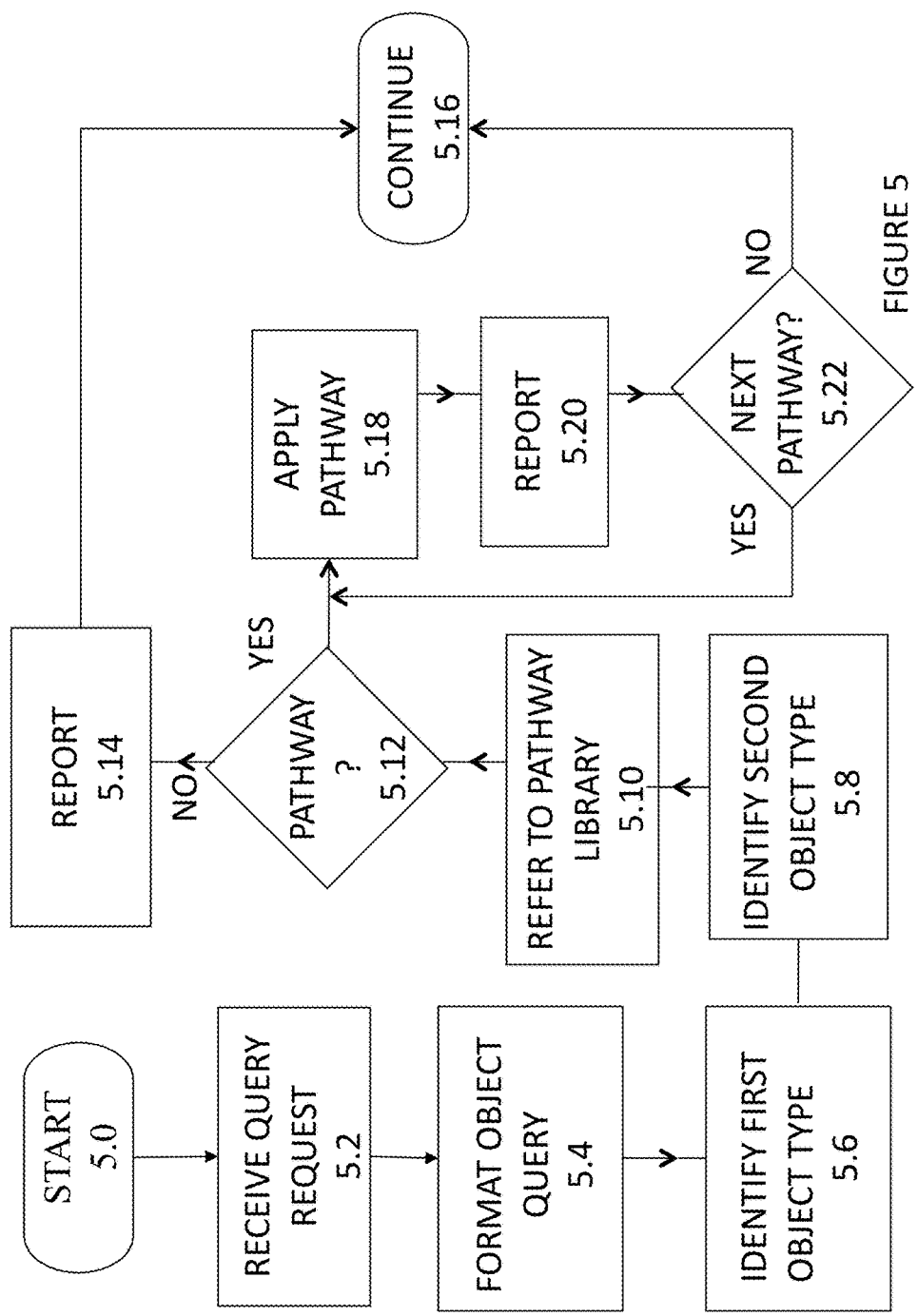

| PW.ID.1 | OBJ.T1 | OBJ.T2 | DIR.1 | OBJ.TA | M | OBJ.TB | 1 |

FIRST PATHWAY RECORD PW.REC.1

| PW.ID.2 | OBJ.T1 | OBJ.T2 | DIR.0 | OBJ.TN | C1 | OBJ.TH | C2 |

SECOND PATHWAY RECORD PW.REC.2

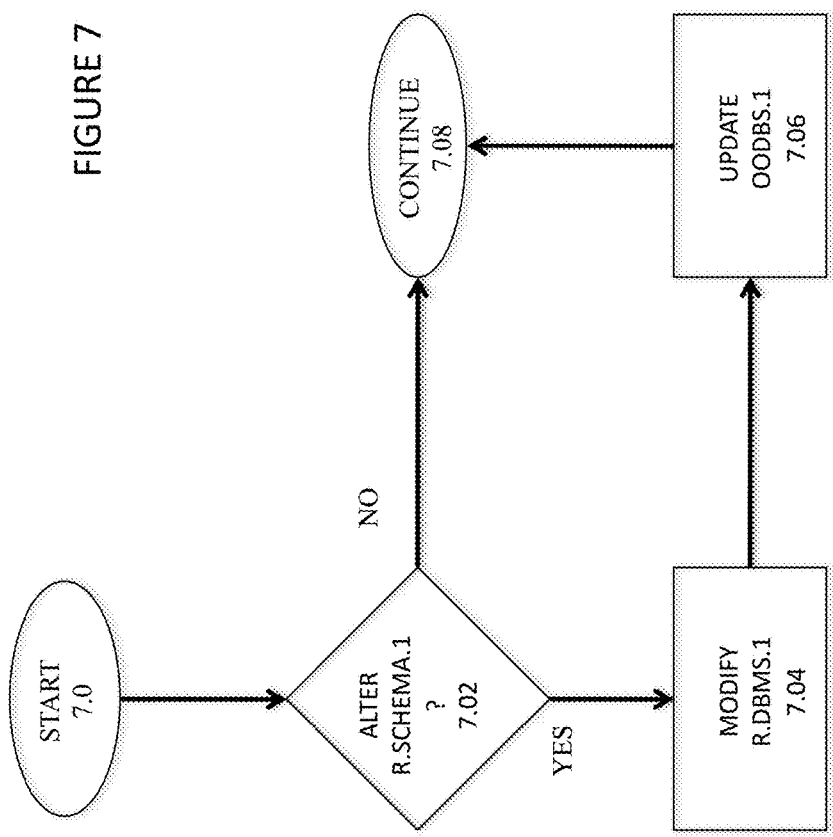

FOR ACCELERATION OF PATHWAY SELECTION, APPLICATION, AND RANKING IN A HYBRID NETWORK

CO-PENDING US NONPROVISIONAL PATENT APPLICATION

The present patent application is a Continuation-in-Part of the U.S. Nonprovisional patent application Ser. No. 12/753,835 titled "Method and system for acceleration of pathway detection and ranking within an information technology database" filed on Apr. 2, 2010 by inventor Leon Guzenda. This co-pending U.S. Nonprovisional patent application Ser. No. 12/753,835 is incorporated in its entirety and for all purposes. The present patent application claims benefit of the priority date of Apr. 2, 2010 of the co-pending U.S. Nonprovisional patent application Ser. No. 12/753,835.

FIELD OF THE INVENTION

The present invention relates generally to network communications management systems, and more particularly to performing searches within a network that includes nodes of more than one type, and having more than one type of link between nodes.

BACKGROUND OF THE INVENTION

Conventional electronic information technology networks and systems are often designed to be scalable to manage access to, and messaging with, a plurality of uniquely distinguishable and separately addressable data structures, such as nodes within a network or a database. Certain conventional networks of nodes and connections sometimes, i.e. a graph structure, consist of nodes of one or more types generally having binary connections of one or more type with varying cardinalities. Each binary connection joins together exactly two nodes. The cardinality possibilities of the plurality of binary links between nodes within a network or database may include one-to-one, one-to-many, many-to-one, or many-to-many.

Prior art algorithms describe how to find the shortest path between two nodes within a network, e.g. travel routes within a road network, usually with a constraint related to each link, such as the distance between each node or the time taken to travel between specific pairs of nodes. Such node pathway-determination algorithms are currently used in certain navigation systems and telecommunications networks, but these prior art pathway determination-algorithms can also be applied to Internet and webservice data sources and social networks.

Prior art node pathway-determination algorithms generally assume that the cardinality of the connections is always many to many, or of one type only, and that there is only one type of connection. A hybrid information technology network might represent the interrelationships noted among road, canal, railway and commercial flight connections, wherein there network identifies nodes of more than one type and more than one type of binary links between various node pairs. The present invention is drawn toward hybrid networks.

In the prior art, information that codifies a hybrid network may be stored within one or more relational databases, object oriented databases, and federated database. It is understood that a federated database is a database that is distributed and deployed through out a plurality of computers of an information technology network. An exemplary information technology network may be, include, or partially include, the Internet, an intranet, an extranet, a telephony network, and/or a wireless telephony network.

The relational and object-relational models for data of information technology systems are very powerful in conventional configurations of database management systems ("DBMS"). More particularly, relational databases store data in tables, wherein each table includes at least one column and all entries within each column are of a same type. Each row of a relational database table consists of at least one column. Relationships between rows are either defined (a.) implicitly by the presence of a field with the same content in the rows, e.g. a Customer_ID field in a Customer table and also in a Product Order table, or (b.) explicitly in a separate "join" table that, for example, has rows with a Customer_ID and a Product_Order_ID in them.

Database queries can be structured to enable retrieving representations of information ("data"). In object-oriented database systems ("OODBMS") relationships between objects are expressed by object identifiers that specify an individual software object, and link attributes of the link formed when a first software object references an object identifier of a second software object.

Queries are generated and applied in a relational database using a structured query language ("SQL"). An SQL statement is a command that explicitly describes what data is to be retrieved from or stored in the relational database system as a result of the statement, but leaves up to each system the mechanisms and sequence of operations for producing the desired result. Several database management systems that accept SQL statements are commercially available at the time of this writing.

In an OODBMS, data may be stored in one or more data containers. The term container is used to refer to any set of data that is processed as a set of one or more records, e.g., software objects ("objects"), each record being organized into one or more fields. In relational database systems, the containers are called "relations" or "tables," the records are referred to as "rows," and the fields are referred to as "columns," and each table has a fixed number of columns. In an object-relational database a column can be associated with an object type that is made-up of several attributes.

Based on the foregoing, there is a clear need for techniques to improve the efficiency of performing queries within a hybrid network, wherein the existence of more than one type of record and more than one type of link may be exploited.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

This and other objects of the present invention are made obvious in light of this disclosure, wherein embodiments of the method of the present invention are presented that overcome one or more deficiencies in the prior art by converting a schema of a hybrid network, either derived from a federated database, a relational data dictionary or an external metadata repository, into an object-oriented schema that explicitly defines relationships between columns in the tables of the relational database and represents the tables as object classes. In another aspect of the method of the present invention, the derived object-oriented schema is analyzed and optimal search paths are derived and stored for subsequent use in performing queries. When the schema of the source hybrid network changes, or is altered, an updated object-oriented schema may be newly derived and the newly derived object-oriented schema is analyzed, and updated optimal search paths are derived and stored for subsequent use in performing queries.

In yet another aspect of the method of the present invention, a query engine accesses the predefined search paths in order to execute the specific types of queries and incrementally populates instances of transient or persistent structures useful in determining the probable relative efficiency of selected predefined search paths between software objects, or alternately between two object types, of the derived object-oriented schema.

In still additional aspects of the method of the present invention, data fields used by relational join operations are replicated in transient or persistent data structures with explicit support for named relationships between software objects that may have 1:1, 1:many, many:1 or many:many cardinality. The method of the present invention provides more than a trivial navigational schema; the derived object oriented schema can, for example, be built in alternate aspects to support web browser access to data in a source relational database and/or a source federated database. The method of the present invention may use algorithms to predetermine the optional search path for finding relationships between any two rows of any of one or more tables, including relationships defined between other tables of a same database, of different databases and/or of a federated database.

Even other alternate preferred embodiments of the method of the present invention enable extremely fast execution of certain query types to include, but nor limited, queries of the following syntax or content types:

a) Find if any kind of path of links between one row and another row exists;

b) Find the shortest series of links between one row and another row; and c) Find all links between one row and another row.

Computer-readable media having computer-executable instructions for performing methods of componentization embody further aspects of the invention.

Alternatively, the invention may comprise various other methods and apparatuses such as hybrid networks.

Other features will be in part apparent and in part pointed out hereinafter. Still additional features and advantages of the invention will be made apparent from the following detailed description of illustrative embodiments that proceeds with reference to the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 7,519,577 (inventors: Brundage, et al.; issued on Apr. 14, 2009) titled "Query intermediate language method and system"; U.S. Pat. No. 7,562,346 (inventors Jhanwar, et al.; issued on Jul. 14, 2009) titled "Software componentization for building a software product"; U.S. Pat. No. 7,555,771 (inventors; Bransom, et al.; issued on Jun. 30, 2009) titled "System and method for grouping device or application objects in a directory service";

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is a flow chart of a first process of the computer of FIG. 1, wherein an object-oriented schema is generated from a relational database schema of the relational database system of FIG. 1;

FIG. 5 is a flow chart of a second process of the computer of FIG. 1, wherein search pathways are selected and applied in accordance with certain aspects of the method of the present invention;

FIG. 7 is a flow chart of an additional optional process of the computer of FIG. 1, wherein the computer updates a relational database schema and an object-oriented database schema;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
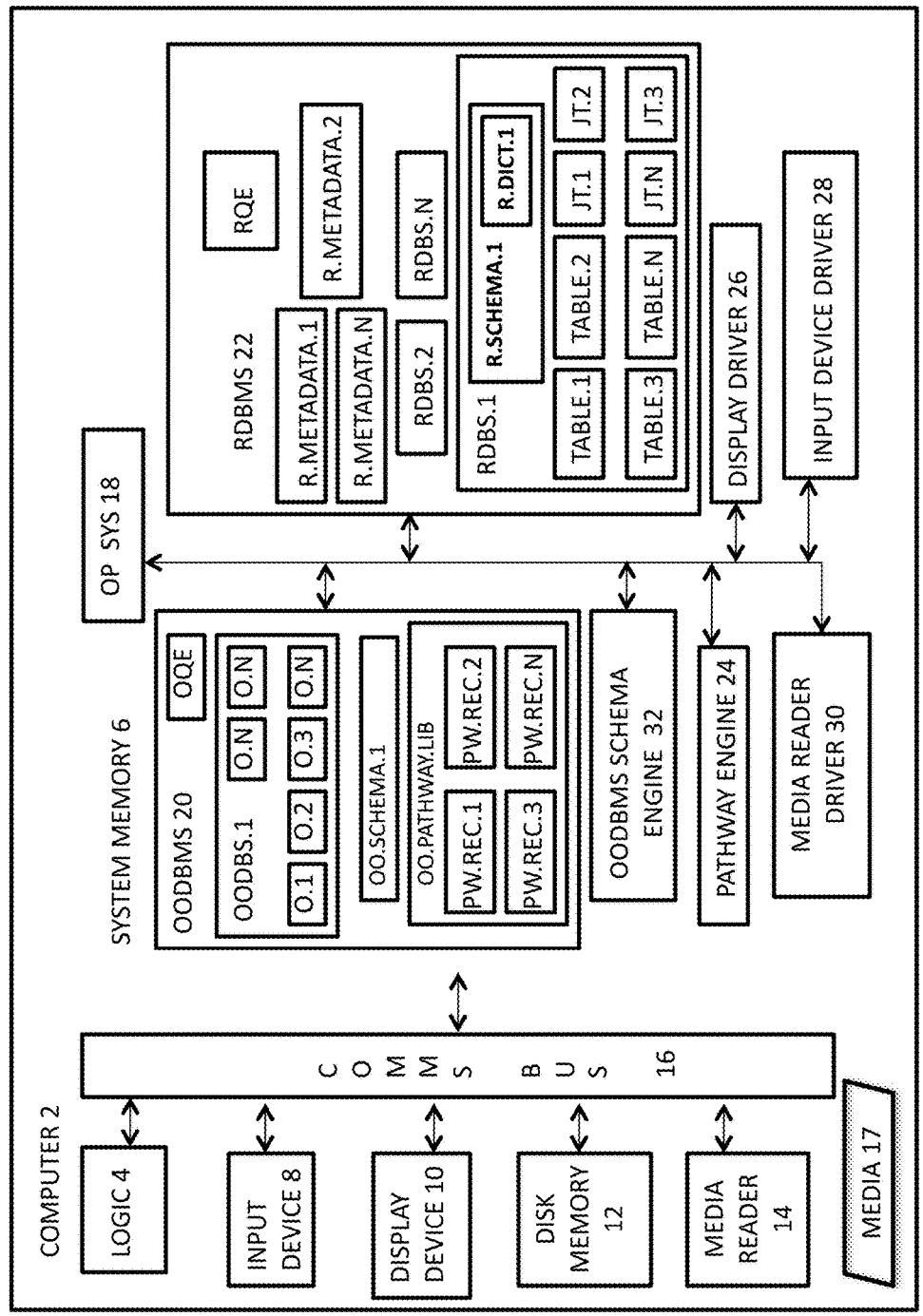
FIG. 1 is a schematic of a computer configured with a relational database management system and an object-oriented database system.

Referring now generally to the Figures and particularly to FIG. 1, FIG. 1 is a schematic of a computer 2 having a logic 4, a system memory 6, a data input peripheral 8, a display device 10, a disk memory 12, and a digital media reader 14 that are bi-directionally communicatively coupled by a communications bus 16.

The electronic media reader 14 is configured to read machine-executable instructions from a computer-readable medium 17, wherein the machine-executable instructions direct the computer 2 to perform one or more aspects or the steps of the method of the present invention.

The terms "computer-readable medium" 17 and "computer-readable media" as used herein refer to any suitable tangible medium known in the art that participates in providing instructions to the computer 2. Such a medium may take many forms, including but not limited to, non-volatile tangible media and volatile tangible media, and transmission media. Non-volatile tangible media includes, for example, optical or magnetic disks, such as may be comprised within the system memory 6 or the removable medium 17. Volatile media includes dynamic memory.

Common forms of computer-readable media 17 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer system The system memory 6 includes a plurality of software modules, including an operating system 18, an object oriented database management system ("OODBMS") 20, a relational database management system ("RDBMS") 22, a pathway engine 24, a display driver 26, an input device driver 28, and a media reader driver 30. The OODBMS 20 may be or comprise an object oriented database management system as marketed by Objectivity, Inc., of Sunnyvale, Calif.

The computer 2 may be a may be or comprise (a.) a network-communications enabled SUN SPARCSERVER™ computer workstation marketed by Sun Microsystems of Santa Clara, Calif. running LINUX™ or UNIX™ operating system; (b.) a network-communications enabled personal computer configured for running WINDOWS XP™, VISTA™ or WINDOWS 7™ operating system marketed by Microsoft Corporation of Redmond, Wash.; (c.) a VAIO FS8900™ notebook computer marketed by Sony Corporation of America, of New York City, N.Y.; or (d.) a PowerBook G4™ personal computer as marketed by Apple Computer of Cupertino, Calif.

The system memory 6 including the RDBMS 22 and the OODBMS 20 may be, or comprise, or be comprised within, a federated database that might include in singularity or combination (1.) an additional object oriented database management system as marketed by Objectivity, Inc., of Sunnyvale, Calif.; (2.) an IBM DB2 Universal Database™ server (in Linux, UNIX®) marketed by IBM Corporation of Armonk, N.Y.; (3.) WINDOWS™ operating system environments marketed by Microsoft Corporation of Redmond, Wash.; and/or (4.) multiple data sources to which the client query application sends queries.

The RDBMS 22 might be or include a combination of (1.) an IBM DB2 Universal Database™ server (in Linux, UNIX®) marketed by IBM Corporation of Armonk, N.Y.; (2.) WINDOWS™ operating system environments marketed by Microsoft Corporation of Redmond, Wash.; and (4.) multiple data sources to which the client query application sends queries.

The RDBMS 22 includes a relational database query engine RQE, a plurality of relational databases RDBS.1-RDBS.N and optionally a plurality of relational database metadata R.METADATA.1-R.METADATA.N. As illustrated in FIG. 1 as represented by the exemplary first relational database RDBS.1, each relational database includes a plurality of tables TABLE.1-TABLE.N and an optional first relational database schema record R.SCHEMA.1. The first metadata R.METADATA.1 and or the first relational database schema record R.SCHEMA.1 may include, in whole or in part, a representation of a first relational database schema of the first relational database RDBS.1 that may be interpreted by an object-oriented database schema engine 32 to generate a first object-oriented schema OO.SCHEMA.1. The first object-oriented schema OO.SCHEMA.1 is used by the OODBMS to generate a first object-oriented database OODBS.1, wherein the first object-oriented database OODBS.1 is an object-oriented representation of the first relational database schema. Alternatively or additionally, the object-oriented database schema engine 32 may generate, in whole or in part, the first object-oriented schema OO.SCHEMA at least partly on the basis of an analysis of the first relational database RDBS.1.

A pathway engine 24 analyzes the first object-oriented schema OO.SCHEMA and generates therefrom an object-oriented pathway library OO.PATHWAY.LIB. The object-oriented pathway library OO.PATHWAY.LIB contains a plurality of pathway records that each indicate a pathway found between two object classes of the first object-oriented schema OO.SCHEMA.

Figure 2:
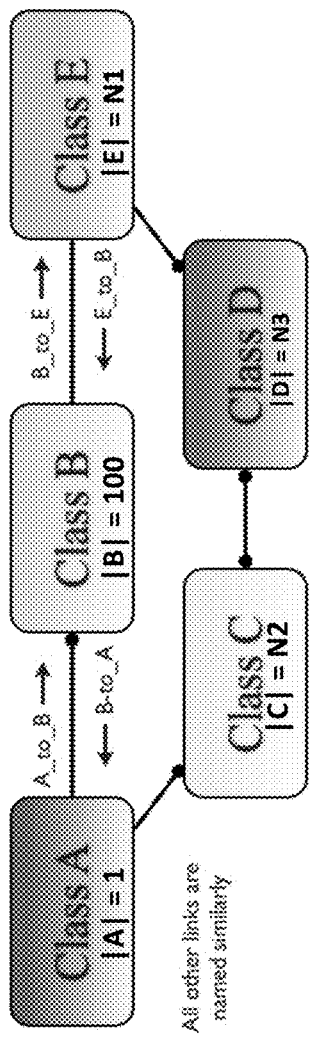
FIG. 2 is a diagrammatic representation of certain object classes of the object-oriented database system of FIG. 1.

Referring now generally to the Figures and particularly to FIG. 2, FIG. 2 is a diagrammatic representation of certain object classes A, B, C, D & E of the first object-oriented schema OO.SCHEMA linked together with relationships whose cardinality is indicated in FIG. 2 by the presence or absence of a filled circle, where a circle at the end of each connection denotes a "1:Many" or "Many:Many" association. For example, the relationship A_to_B has cardinality 1-to-many and the relationship B_to_A has cardinality many-to-1.

FIG. 2 illustrates the shortest links, i.e., least links to be explored, and other paths between two pairs of object classes, for example {A, B} and {A, E}. Consider a database with exactly one instance of an object of class A, designated A1, connected to 100 instances of class B, designated {B1, B2, B3 ... B100}. When the analytic goal is to determine whether the object instance A1 is connected to object instance B100, it might take 100 link traversals {A1 to B1, A1 to B2, A1 to B100} to determine whether or not they are linked via relationship A_to_B. However, reversing the direction of the search, from {B100 to A1}, produces a result in one link traversal. That is the key to the search path map algorithm of certain aspects of the method of the present invention: finding a route through the first relational database RDBS.1 that uses as few many-to-many and one-to-many links of the derived first object-oriented schema OO.SCHEMA as possible.

Figure 3:
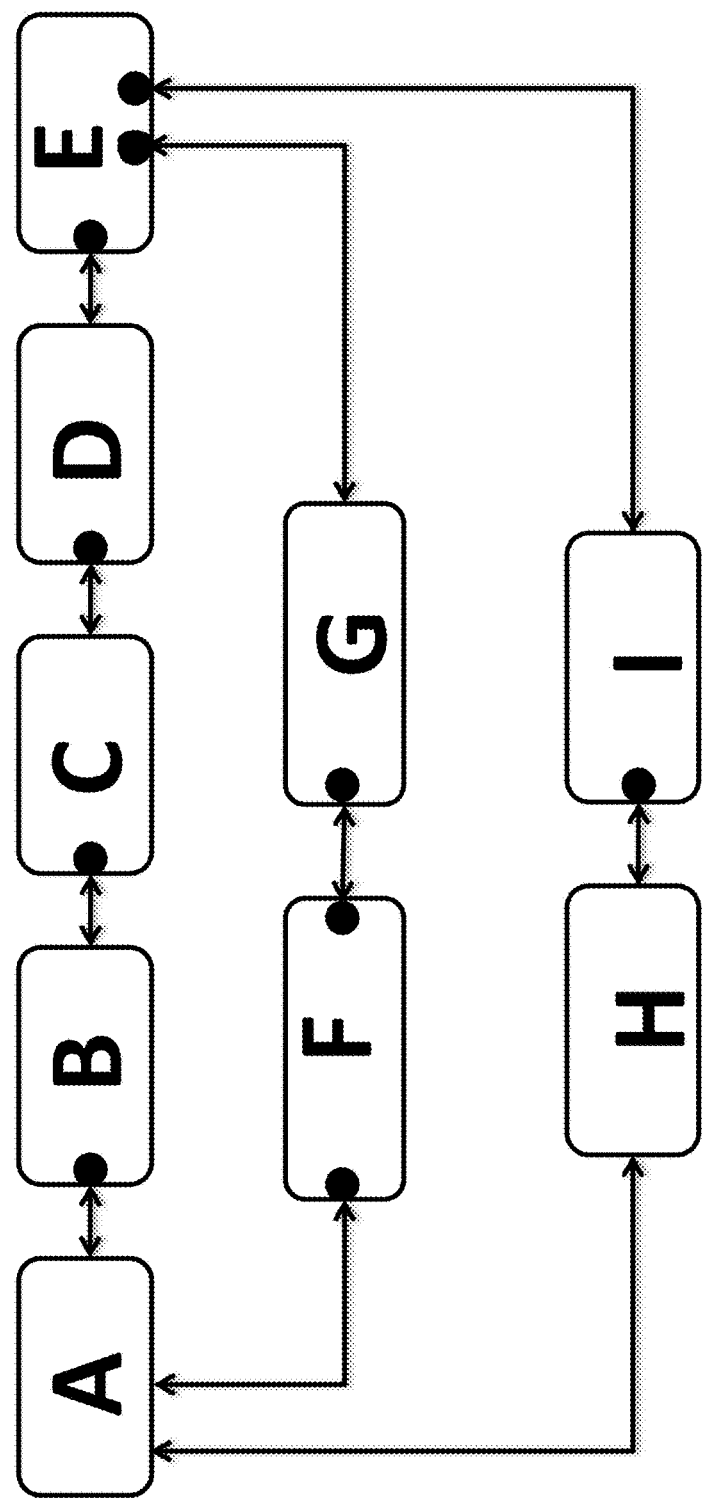
FIG. 3 is a representation of a search algorithm that works by finding all possible paths between pairs of objects of the object-oriented database system of FIG. 1 and then classifying the links according to their cardinality.

Referring now generally to the Figures and particularly to FIG. 3, FIG. 3 is a representation of a search algorithm that works by finding all possible paths between pairs of objects and then classifying the links according to their cardinality. Relationships of cardinality between each group are indicated in FIG. 3 by the presence or absence of a filled circle, where a circle at the end of each connection denotes a "1:Many" or "Many:Many" association. In the example of FIG. 3, six pathways are found between the Object Class A and an Object Class E of the first object-oriented schema OO.SCHEMA, and each pathway has a directionality or either from Class A to Object E, or from Class E to Object Class A.

A Pairing One describes a first pathway from Object Class A through Object Classes B, C and D and to Object Class E. This Pairing One includes four one-to-many type links. Conversely, a Pairing Two describes a second search pathway from Object Class E through Object Classes D, C and B and to Object Class A. This Pairing Two is thus shown to include four many-to-one type links, and thus indicates a more efficient search pathway than Pairing One.

A Pairing Three describes a third pathway from Object Class A through Object Classes F and G and to Object Class E. This Pairing Three includes two one-to-one type links and one many-to-many type link. Conversely, a Pairing Four describes a fourth search pathway from Object Class E through Object Classes G and F and to Object Class A. This Pairing Four is thus shown to include two one-to-one type links and one many-to-many type links, and thus indicates a more efficient search pathway than Pairing Three or Pairing One, but not as efficient as Pairing Two.

A Pairing Five describes a fifth pathway from Object Class A through Object Classes H and I and to Object Class E. This Pairing Five includes one, one-to-one link types and two one-to-many link types. Conversely, a Pairing Six describes a sixth search pathway from Object Class E through Object Classes H and I and to Object Class A. This Pairing Six is thus shown to include one, one-to-one link type and two many-to-one type links, and thus indicates a more efficient search pathway than Pairing One, Pairing Two, Pairing Three, Pairing Four and Pairing Five.

Table One below presents the analysis of the six pathways of FIG. 3.

TABLE 1

1. A->B->C->D->E          4 links          MMMM
// M indicates a 1:Many link type; and a 1 indicates a 1:1 or Many:1 link type.
2. E->D->C->B->A          4 links          1111
// Pathway 2 is more efficient than Pathway 1.
3. A->F->G->E             3 links          MMM TABLE 1-continued // Pathway 3 is more efficient than Pathway 1 and Pathway 2, but is probably slower than Pathway 2.
4. E->G->F->A             3 links          1M1
// Pathway 4 is more efficient than Pathway 1 or Pathway 3, but may be less efficient than Pathway 2.
5. A->H->I->E             3 links          1MM
// Pathway 5 is the same as Pathway 4 in link count, but is less efficient.
6. E->I->H->A             3 links          111
// Pathway 6 has same number of links as Pathway 4 and Pathway 5 but is most efficient.

The computer's 2 relational database RDBS.1 of FIG. 1 creates tables TABLE.1-TABLE.N of ordered pathways between requested nodes. These tables TABLE.1-TABLE.N order the pathways in accordance to efficiency.

Referring now to FIG. 4, FIG. 4 is a flow chart of a first process of the computer 2, wherein an object-oriented schema is generated from a relational database schema. In step 4.2 a relational database is selected by a user or by an automated process of the system software of the computer 2. In step 4.4 the computer 2 reads some or all of the schema of the selected relational database from a metadata of the selected relational database. Alternatively or additionally, in step 4.6 the computer 2 reads some or all of the schema of the selected relational database as stored within a selected relational database schema record R.SCHEMA.1 of the selected relational database RDBS.1. Still optionally, additionally or alternatively the computer 2 determines in step 4.8 whether to generate some or all of the relational database schema, from which determination the computer 2 may proceed on to step 4.10 and to analyze the selected relational database and to generate all or some of the schema of the selected relational database RDBS.1.

The computer object-oriented database schema engine 32 in step 4.12 and derives a first object-oriented schema OO.SCHEMA.1 from the schema of the selected relational database R.SCHEMA.1 wherein the tables of the selected relational database are represented as object classes and relationships between columns of tables of the selected relational database are defined within the first object-oriented schema OO.SCHEMA.1. The object oriented database manager OODBMS further generates a derivative object oriented database OODBS.1 from the first object-oriented schema OO.SCHEMA.1 and data harvested from the exemplary relational database R.SCHEMA.1. The computer 2 then analyzes the object-oriented schema derived in step 4.14, determines the pathways between the object classes within the derivative object oriented database OODBS.1 and generates a pathway record PW.REC describing each discovered pathway. The pathway records PW.REC are then ordered in step 4.16 by the computer to indicate which search pathways are more likely to provide efficient results in a search process. According to certain alternate aspects of the method of the present invention, the user may alter the order of the pathway records. The pathway records PW.REC are further stored in the pathway library OO.PATHWAY.LB of the system memory of FIG. 1.

The process of steps 4.12 and 4.14 may be accomplished through the following prior art steps:

a) The exemplary relational database RDBS.1 includes a schema dictionary R.DICT.1 that contains a relational schema that describes the table TABLE.1-TABLE.Ns, columns, rows and supplementary structures, such as indices, that are stored in the exemplary relational database RDBS.1.

b) The schema dictionary R.DICT.1 is accessible via standard Structured Query Language ("SQL") and, generally, other prior art application program language interfaces.

c) Each table type in the schema dictionary R.DICT.1 can be directly represented in the derivative object oriented database OODBS.1 as an object class that has field names corresponding to the column names in the relational schema R.SCHEMA.1 of the relational database dictionary RDBS.1.

d) Join tables JT.1-JT.N of the relational database RDBS.1, which represent links between rows in one table TABLE.1-TABLE.N and the same or another table TABLE.1-TABLE.N of the relational database RDBS.1, consist of at least two columns, e.g. with a "Product_Code" corresponding to a column in an exemplary "Products" table TABLE.3 and a "Customer Code" corresponding to a column in an exemplary "Customers" table TABLE.3. If the join table JT.1 and the other tables TABLE.1-TABLE.N use the same column names then the relationship can be extracted directly and it can be represented in an exemplary object oriented database OODBS.1 as a named relationship. The cardinality (1:1, 1:many, many:1 or many:many) can only be generally derived by examining the actual database, or by supplementing the derived information with human input. It the join table JT.1 and other tables TABLE.1-TABLE.N use different column names for the same actual data type and value, e.g "Prod_Code", instead of "Product_Code", then direction from the human operator is required.

e) Although knowledge of indices isn't essential, it can also be captured from the relational schema R.SCHEMA.1 and used to create equivalent indices in the derivative object oriented database OODBS.1.

More particularly tables of the relational database RDBS.1 become object classes of the derivative object oriented database OODBS.1. Columns of the relational database RDBS.1 become fields in a derivative object class of the exemplary object oriented database OODBS.1. Relationships which exist among the data within the of the relational database RDBS.1 are represented as named relationships in the derivative object schema OO.SCHEMA.1. Rows in the actual exemplary relational database RDBS.1, rather than the schema of the exemplary relational database RDBS.1, become object instances O.1-O.N in the derivative object oriented database OODBS.1 and the relationships among data of the relationship database R.DBS.1 are directly represented using internal structures of the derivative object oriented database OODBS.1, rather than implicitly by value. Indices of the relational database RDBS.1 may or may not be carried over from the relational schema R.SCHEMA.1 of the relational database RDBS.1 to the object schema OO.SCHEMA.1 of the derivative object oriented database OODBS.1, depending on the intended usage of the derivative object oriented database OODBS.1.

In the relational database RDBS.1 a join table JT.1-JT.N might have two columns, for example Product_Code and Customer_Code. There might be rows in the join table JT.1-JT.N comprising the a plurality of values, to include {"Product_X", "Customer_A"} and {"Product_X", "Customer_D"}. In the derivative object oriented database OODBS.1 the object O.1 holding data for "Product_X" might have an object identifier (OID) 001 and a plurality of Customer objects O.2-O.3 might have OIDs 0050 and 0060. A product object O.1 will have a structure including the OID's 005 and 0060 that form a link to a first customer object O.2 and a second customer object O.3. The first customer object O.2 is derived from and comprises Customer A data. The second customer object O.3 is derived from and comprises Customer D data. The Customer objects O.2 and O.3 will each have a link to the product object O.1 by referencing or including OID 0001. Additional pluralities of objects O.N and JT.1-JT.N are derived from the other aspects, rows, and columns of the exemplary relational database RDBS.1

The above process can be reversed to create a derivative relational database schema from a source object database schema.

The computer proceeds from step 4.16 to step 4.18 and to perform alternate computational processes.

Referring now to FIG. 5, FIG. 5 is a flow chart of a second process of the computer 2, wherein search pathways are selected and applied in accordance with certain aspects of the method of the present invention. In step 5.2 the computer 2 receives either an automated query request or a query request from a user to perform a search query. The query request relates to information stored in the first relational database RDBS.1. In step 5.4 the computer interprets the query received in step 5.2 in accordance with the derived first object-oriented schema OO.SCHEMA.1 and format a query applicable by the object-oriented query engine OQE. In the step 5.6 the computer identifies a first object and object type of the query and in step 5.8 the computer 2 identifies a second object type of the query. The computer applies the object-oriented query engine OQE in step 5.10 to the pathway records of the pathway library OO.PATHWAY.LIB in step 5.10 and determines in step 5.12 whether any pathway record exists that indicates the existence of a pathway between object types identified in steps 5.6 and 5.8. Where no relevant pathway record is found in step 5.12, the computer proceeds on to step 5.14 and to report this finding, and therefrom on to step 5.16 to perform alternate computational processes. Where at least one relevant pathway record is found in step 5.12, the computer proceeds on from step 5.12 to step 5.18, wherein the object-oriented query engine applies a first selected relevant pathway with the query of step 5.18. The computer in step 5.20 stores and reports the results of the query action of step 5.18 and proceeds onto step 5.22 to determine whether any additional relevant pathway records are stored within the pathway library OO.PATHWAY.LIB. When an additional relevant pathway record is found in step 5.22, the computer applies the additional relevant pathway record in another execution of the process loop of steps 5.18, 5.20 and 5.22. When an additional relevant pathway record is not found in step 5.22, the computer proceeds therefrom on to step 5.16 to perform alternate computational processes.

Figure 6A:
FIGS. 6A and 6B are schematics pathway records of the object-oriented database system of FIG. 1.
Figure 6B:

Referring now to FIGS. 6A and 6B, FIG. 6A is schematic of a first search pathway record PW.REC.1 and FIG. 6B is a schematic of a second search pathway record PW.REC.2. The first pathway record PW.REC.1 includes a first record identifier PW.ID.1 that uniquely identifies the first pathway record PW.REC.1 within the computer. The first pathway record PW.REC.1 further includes a first query object type OBJ.T1 and a second query type OBJ.T2. The directionality of a first pathway formed between the first query object type OBJ.T1 and the second query type OBJ.T2 may be indicated by the syntax of the first pathway record PW.REC.1, or alternatively or additionally by a directionality indicator DIR.1. The first pathway record PW.1 additionally includes one or a plurality of object types identifiers OBJ.TA-OBJ.TN and associated cardinalities M and 1. Each object type identifier OBJ.TA-OBJ.TN referenced in the first pathway record PW.REC.1 relates to an object found within the first pathway that connects the first query object type OBJ.T1 and the second query type OBJ.T2. The associated cardinality of each object type OBJ.TA-OBJ.TN stored within the first pathway record PW.1 is dependent upon the directionality of the pathway as identified by the syntax of the first pathway record PW.REC.1 and/or the directionality indicator DIR.1.

The value M indicates that according to the directionality DIR.1 of the first pathway record PW.REC.1, that the cardinality of the relation ship between the first object OBJ.T1 to the next object OBJ.TA is classed as a One-to-Many or a Many-to-Many Cardinality.

Referring now to FIG. 6B, the second pathway record PW.REC.2 includes a second record identifier PW.REC.2 that uniquely identifies the second pathway record PW.2 within the computer. The second pathway record PW.REC.2 further includes a first cardinality C1 associated with a type N object type OBJ.TN and a second cardinality value C2 associated with a type H object type OBJ.TH. The first cardinality value C1 and/or the second cardinality value C.2 may be provided to the computer by a user, or derived by the computer from an analysis of the first object-oriented schema OO.SCHEMA.1.

Referring now to FIG. 7, FIG. 7 is a flow chart of an additional optional process of the computer, wherein the computer determines in step 7.02 whether a command to the first relational database RDBS.1 has been received either from a user or generated by an alternate process. When the computer determines in step 7.02 that the first relational database schema shall be altered, the computer proceeds from step 7.02 to step 7.04 to modify the first relational database RDBS.1 according to the schema update command of step 7.02, and to update the first relational schema record R.SCHEMA.1 to reflect the modification performed in accordance with update command of step 7.02. The computer 2 proceeds from step 7.04 to step 7.06 to update the associated derived first object-oriented database OODBS.1 by application of the object-oriented schema engine OO.SCHEMA ENGINE with the updated first relational schema record R.SCHEMA.1. The computer 2 proceeds from either step 7.02 or step 7.06 to step 7.08 and to perform alternate computational processes.

Figure 8:
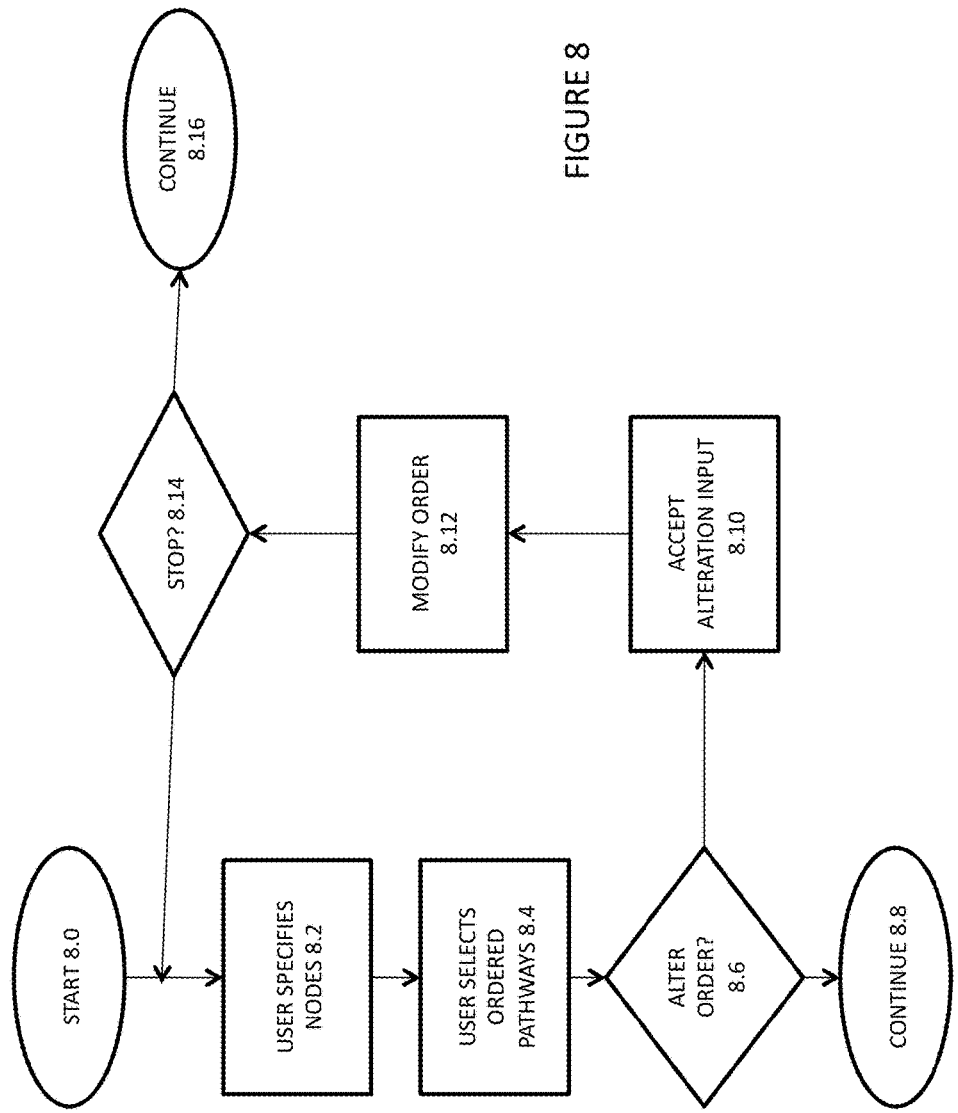
FIG. 8 is a flow chart of an optional process wherein a human user may alter the order of rendered pathways.

Referring now to FIG. 8, FIG. 8 is a flow chart of an optional process wherein a human user may alter the order of rendered pathways. Beginning with step 8.2, using the input device 8 a user specifies multiple nodes in which said user wishes to have database pathways constructed. This information is displayed to the user through a display device 10. The computer 2, using the pathway engine 24, then generates tables TABLE.1 in which pathways between nodes are ordered by efficiency. The user then selects these pathways (step 8.4). The user optionally can be given a choice to alter the efficiency order of these pathways (8.6). Should the user choose not to alter the order of the pathways, the computer 2 continues with other processes (step 8.8). If the user decides to alter the order of the pathways, the user then uses the input device 8 once again and alters the order to user specified preferences (step 8.10). The computer 2 then reorders the pathways to suit user requests (step 8.12). This operation can optionally be performed multiple times (step 8.14).

Figure 9:
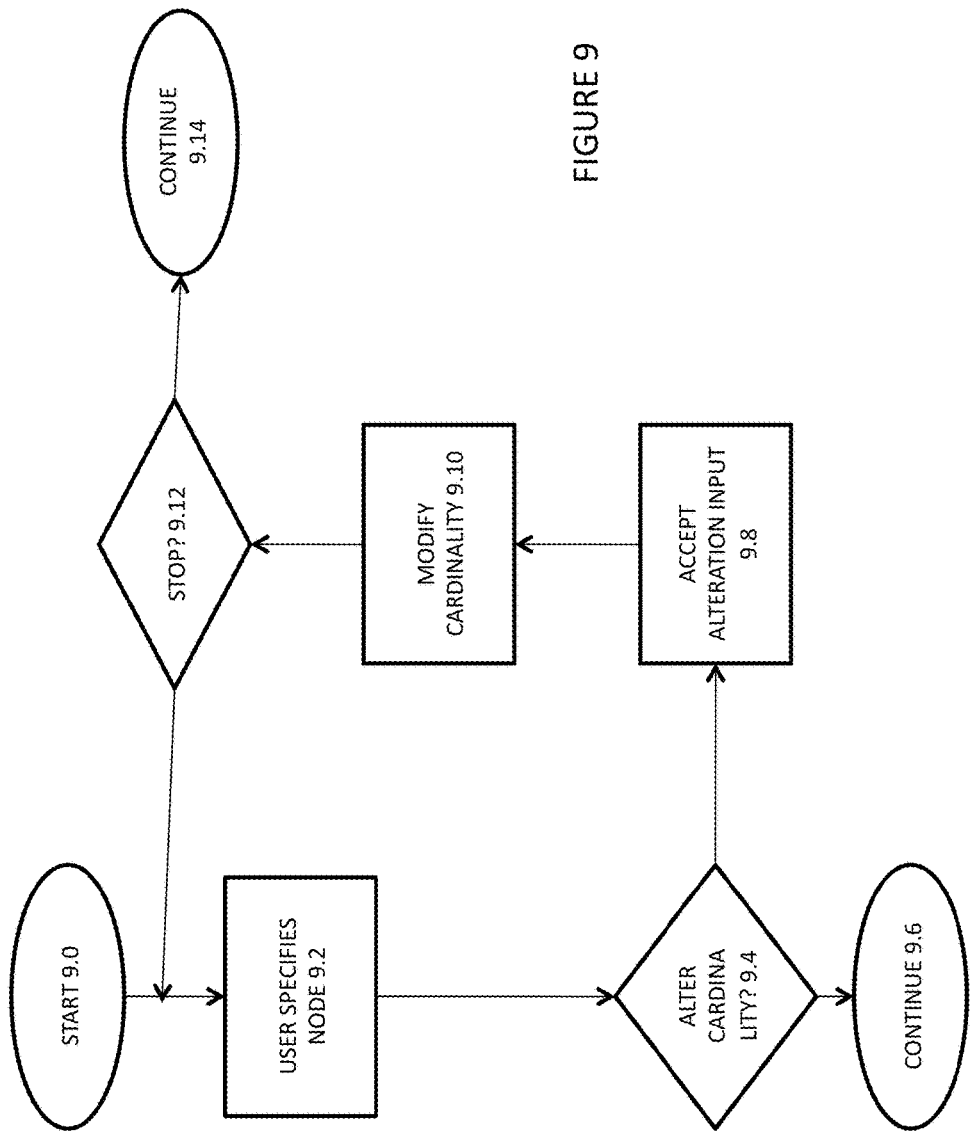
FIG. 9 is a flow chart of an optional process wherein a human user may alter the order of rendered pathways.

Referring now to FIG. 9, FIG. 9 is a flow chart of an optional process wherein a human user may alter the cardinality of a specified node or group/class. Beginning with step 9.2, using the input device 8 a user specifies a node in which said user wishes to view the cardinality of. This information is displayed to the user through a display device 10. The user optionally can be given a choice to alter the cardinality of order of the selected node (9.4). Should the user choose not to alter the cardinality of the node, the computer 2 continues with other processes (step 9.6). If the user decides to alter the cardinality of the selected node, the user then uses the input device 8 once again and alters the order to user specified preferences (step 9.8). The computer 2 then alters the node cardinality to suit user requests (step 9.10). This operation can optionally be performed multiple times (step 9.12).

Another configuration of this invention would involve rather than a single database, a digitized representation of a hybrid network or nodes. These nodes could contain various different types of data across multiple databases and would be stored over multiple electronic information technology servers. Each node would have a specific node ID to be associated with. Additionally the server the aforementioned node resided on would also have a specific server ID to be associated with. Identically to the method explained in previously referenced figures a plurality of possible pathways between the first node and the second node, where a pathway may be in either the first node towards second node or second node towards first node direction is determined The pathways are ordered according to link count then by cardinality giving preference to one to one links.

As with previous configurations a hybrid network pathway ordering can be rearranged or modified by a human administrator.

Figure 10:
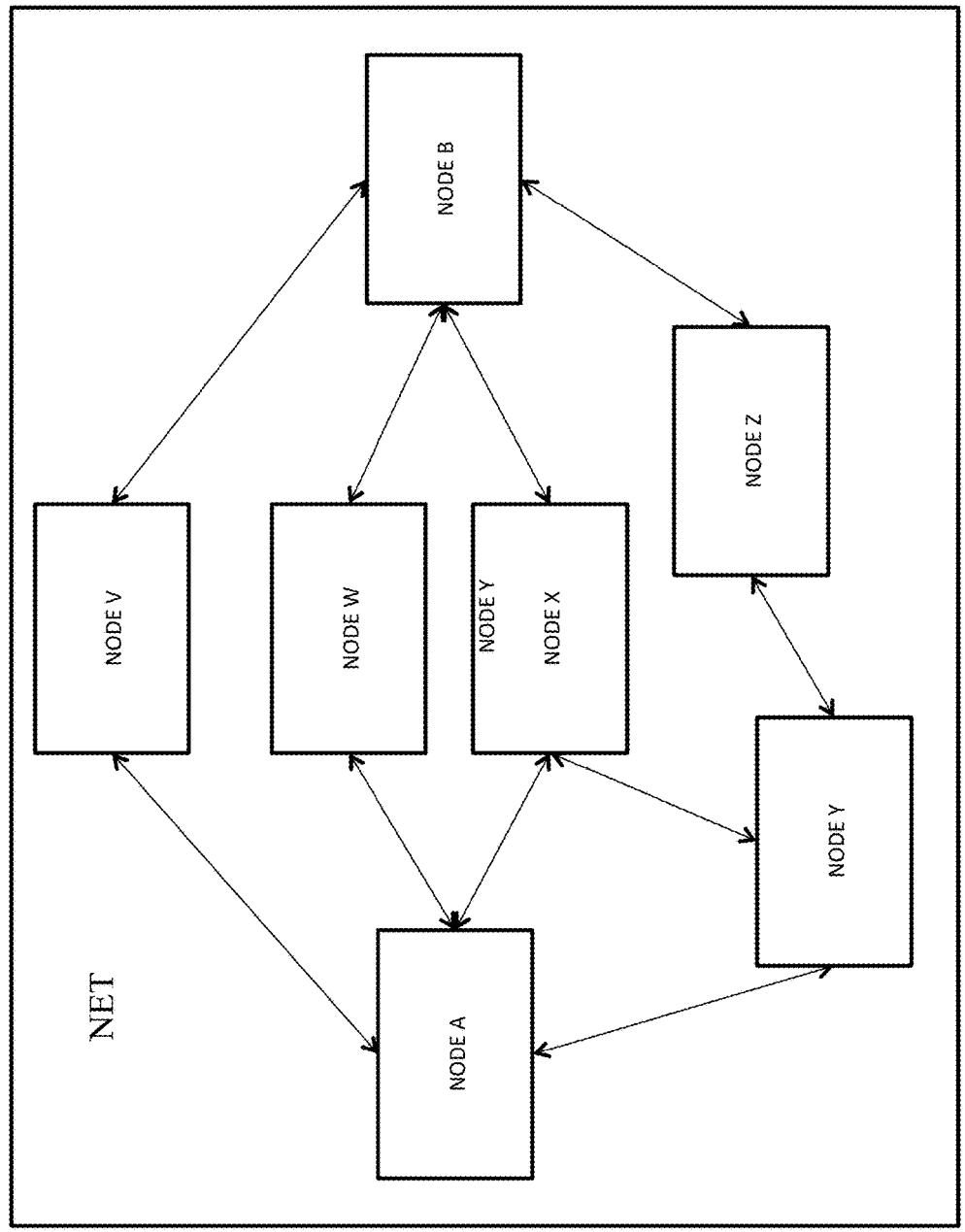
FIG. 10 is a diagram of an exemplary hybrid network.

Referring now to FIG. 10, FIG. 10 is a diagram of an example of a digitized representation NET of a hybrid network (hereinafter, "the hybrid network" NET) that contains multiple nodes A-Z. For the sake of example only, these nodes A-Z will be given identities beyond that of generic titles. The hybrid network NET may be comprised within the computer 2 or distributed within a federated database maintained by a plurality of computers 2 of an electronics communications network Hypothetically Node A could reside within a database of information related to a listing of persons, such as a voting registrar, an exemplary Node A could then represent a specific person. Continuing the hypothetical example, Node B could reside within a database of vehicles such as government archival records. Node B could then be associated with a motor vehicle. Between these two nodes A and B there could be any number of pathways of links and nodes A-Z that may also span various types of nodes A-Z or links. Such as a bank database containing loan officer/client information concerning details of a loan, Node V; a service record database containing work orders associated with servicemen, Node W; and/or a title database containing ownership information, Node X. The pathways may potentially be further complicated by the addition of even more types of records such as a tax database that would include family relationships through joint filings, Node Y; the associated family tie of the identified person of Node A could be connected through Node Y to the title information of Node X in the ownership database, and then finally relate from Node X to the vehicle database that holds a record associated with the identified vehicle of interest, Node B. There could be many more potential pathways, for example the personalized Node A, could connected to a joint filing of taxes linking another name Node Y, which is contained in a record of lease contracts, Node Z held in a database of business expenses, which finally connects to a specific vehicle data record Node B, held by the government archival database, e.g., a state department of motor vehicles. These pathways over the hybrid network would, as previously disclosed, be ranked according to the link count and cardinality and be used as a user or human administrator modifies and applies. The aforementioned example is only to be presented as an example of how the invented method could be used and is not intended to suggest that nodes would have to or would be connected in this way.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. In a computer that accesses a hybrid network representation, the hybrid network representation comprising a schema describing a plurality of nodes of differing node types, a method comprising:
    a. Receiving a user selection of a first node of a first type and a second node of a second type;
    b. Determining a plurality of possible pathways between the first node and the second node;
    c. Ordering the plurality of possible pathways according to a link count of each pathway, wherein each link count is equal to a quantity of links observed between each node pathway pair of a comprising pathway; and
    d. Further ordering the plurality of possible pathways by ranking pathways having a one-to-one link between two pathway nodes, whereby pathways having at least one one-to-one link are ordered for earlier examination than pathways having equal link counts and comprising one-to-one links.

2. The method of claim 1, wherein a human administrator modifies the ordering of the plurality of possible pathways.

3. The method of claim 1, further comprising ordering the plurality of possible pathways by ordering pathways having more than one one-to-one links between two pathway nodes of a comprising pathway, whereby pathways having more one-to-one link are ordered for earlier examination than pathways having equal link counts and fewer one-to-one links.

4. The method of claim 1, further comprising ordering the plurality of possible pathways by ordering pathways having a many-to-one link between pathway nodes, whereby pathways having at least one many-to-one link are ordered for earlier examination than pathways having equal link counts and no many-to-one links.

5. The method of claim 4, wherein a human administrator modifies the ordering of the plurality of possible pathways.

6. The method of claim 4, further comprising ordering the plurality of possible pathways by ordering pathways having more than one many-to-one links between pathway nodes, whereby pathways having more many-to-one links are ordered for earlier examination than pathways having equal link counts and fewer many-to-one links.

7. The method of claim 1, wherein the ordering of the plurality of possible pathways is stored for later access.

8. The method of claim 1, wherein the pathway ordering is modified at least partially on the basis of a cardinality of at least one node.

9. The method of claim 1, wherein the pathway ordering is modified at least partially on the basis of a cardinality of at least one link.

10. The method of claim 1, wherein the pathway ordering is modified at least partially on the basis of an assigned weight of a link type.

11. A method of directing a computer that accesses hybrid network representation, the hybrid network representation having a schema describing a plurality of node types and link types, the method comprising:
    a. Receiving an identification from a user of a type of start node and a type of end node
    b. Determining a plurality of pathways from each node of the start node type to each node of the end node type
    c. Counting the links between nodes of each of the plurality of pathways;
    d. Ordering the plurality of pathways in order of fewest links per pathway to most links per pathway; and
    e. Ranking the ordered plurality of pathways on the basis of a cardinality of at least one node of at least one pathway.

12. The method of claim 11, further comprising examining a first pathway for instances of start nodes and end nodes that comprises information that satisfies a query, the first pathway selected from the group of pathways between matching node types having a fewest link count.

13. The method of claim 11, further comprising examining a plurality of pathways for start nodes and end nodes that comprise information that satisfies a query, wherein the plurality of paths examined in an order of pathways from a pathway having a fewest link count to pathways having a higher link count.

14. The method of claim 12, wherein the pathway ordering is modified by a human administrator.

15. The method of claim 12, further comprising ordering the plurality of pathways by ordering pathways having at least one one-to-one links between two pathway nodes of a comprising pathway, whereby pathways having at least one one-to-one link are ordered for earlier examination than pathways having equal link counts and fewer one-to-one links.

16. The method of claim 12, further comprising ordering the plurality of pathways by ordering pathways having at least one many-to-one links between pathway nodes, whereby pathways having more many-to-one links are ordered for earlier examination than pathways having equal link counts and no many-to-one links.

17. The method of claim 12, wherein the pathway ordering is modified at least partially on the basis of a cardinality of at least one node.

18. The method of claim 12, wherein the pathway ordering is modified at least partially on the basis of a cardinality of at least one link.

19. The method of claim 12, wherein the pathway ordering is modified at least partially by a weighted property of at least one link.

20. A tangible, non-transitory computer-readable media comprising machine-readable instructions that direct a computational system to execute the method comprising:
    a. Generating an object-oriented schema from a hybrid network schema or a relational schema;
    b. Analyzing the object-oriented schema to determine a plurality of search pathways that link rows in one table with rows in the same or another table of a same or two different relational database of the hybrid network;

c. Ranking each of the plurality of search pathways for expected computational efficiency, the ranking derived in consideration of a cardinality of at least an object representation of a row, wherein a pathway between a first source node and a first destination node exhibiting at least one link have a one-to-one cardinality is ranked for earlier instantiation than an alternate pathway having the first source node as a source node and the first destination node as a destination node and equal link count;

d. Informing a user of the ranking of the plurality of pathways;

e. Receiving a modification of the ranking of the plurality of pathways; and f. Providing the search pathways in a user modified order to a query engine in accordance with the expected computational efficiency search ranking and the user ranking modification.

* * * * *